United States Patent [19]

Ertl

[11] Patent Number: 5,029,398

[45] Date of Patent: Jul. 9, 1991

[54] MULTIPLE-COORDINATE MEASUREMENT SENSOR

[75] Inventor: Fritz Ertl, Schweinfurt, Fed. Rep. of Germany

[73] Assignee: FAG Kugelfischer Georg Schafer (KGaA), Fed. Rep. of Germany

[21] Appl. No.: 485,373

[22] Filed: Feb. 26, 1990

[30] Foreign Application Priority Data

Feb. 25, 1989 [DE] Fed. Rep. of Germany ....... 3905952

[51] Int. Cl.⁵ ............................................... G01B 7/03
[52] U.S. Cl. ...................................... 33/503; 33/559; 33/561
[58] Field of Search ................. 33/556, 558, 559, 560, 33/561, 557, 503

[56] References Cited

U.S. PATENT DOCUMENTS

| 2,932,482 | 4/1960 | Dickie . | |
|---|---|---|---|
| 3,377,111 | 4/1968 | Brault . | |
| 3,771,230 | 11/1973 | Neuer et al. | 33/559 |
| 3,869,799 | 3/1975 | Sartorio | 33/561 |
| 4,084,323 | 4/1978 | McMurphy | 33/561 |
| 4,523,383 | 6/1985 | Rogers et al. | 33/558 |
| 4,530,160 | 7/1985 | Feichtinger | 33/559 |
| 4,536,961 | 8/1985 | Degoumois | 33/558 |
| 4,578,873 | 4/1986 | Klingler et al. | 33/559 |
| 4,621,434 | 11/1986 | Hirschmann | 33/503 |
| 4,660,296 | 4/1987 | Klinger et al. | 33/559 |
| 4,716,656 | 1/1988 | Maddock et al. | 33/559 |
| 4,805,543 | 2/1989 | Schwab et al. . | |
| 4,882,848 | 11/1989 | Breyer et al. | 33/559 |

FOREIGN PATENT DOCUMENTS

| 2242355 | 3/1974 | Fed. Rep. of Germany . | |
|---|---|---|---|
| 3725205 | 9/1989 | Fed. Rep. of Germany . | |
| 8806710 | 9/1988 | PCT Int'l Appl. | 33/503 |
| 9004149 | 4/1990 | PCT Int'l Appl. | 33/561 |

Primary Examiner—Thomas B. Will
Attorney, Agent, or Firm—Ostrolenk, Farber, Gerb & Soffen

[57] ABSTRACT

A multiple-coordinate measurement sensor has an improved, high degree of precision of measurement, even at higher measurement speeds. Three multiple-axis guide systems (7,13,19; 8,14,20; 9,15,21) are arranged in parallel to each other. Length-measuring devices (6) and zero-point and contact-force generators (5) of each system are fastened to the reference base (1), and the devices (5,6) detect the positions of the guides (7,8,9) which are closest to the reference base (1).

18 Claims, 5 Drawing Sheets

F I G. 2
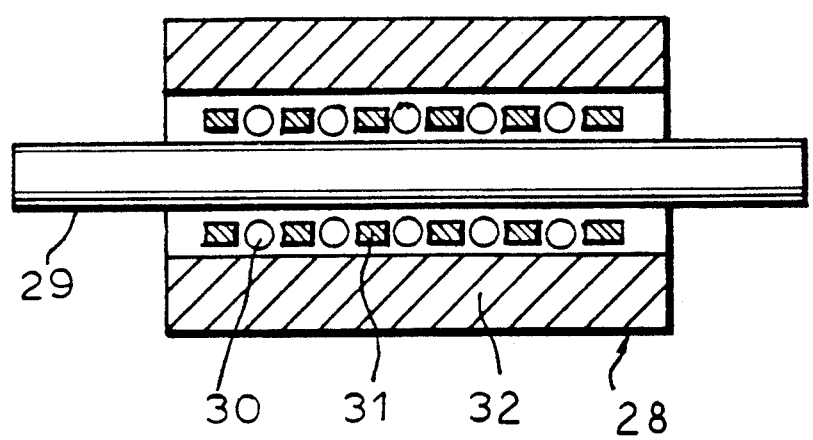
F I G. 4
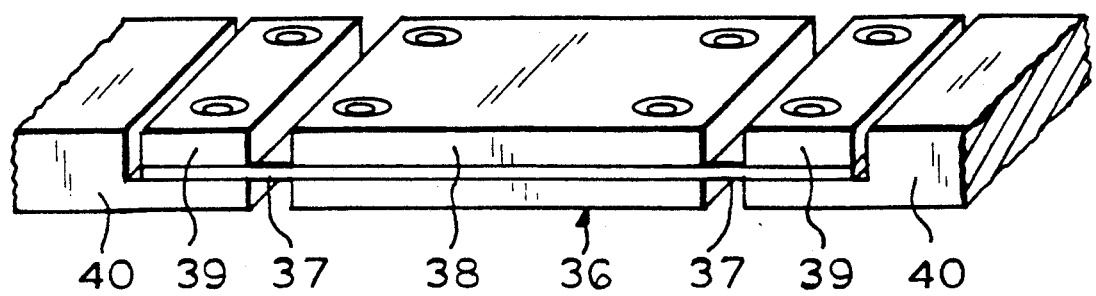

1

MULTIPLE-COORDINATE MEASUREMENT SENSOR

BACKGROUND OF THE INVENTION

The present invention relates to a multiple-coordinate measurement sensor which comprises a low-friction, low-wear, torsionally-rigid kinematic system moveable in at least two and preferably three principal directions x, y and z.

Federal Republic of Germany Patent 22 42 355 (U.S. Pat. No. 3,869,799) describes a multiple-coordinate sensor in which the sensor head comprises a torsionally resistant succession of play-free, friction-free linear guide systems which may consist, for instance, of leaf-spring parallelograms. The disclosure of this and all other prior art materials mentioned herein is incorporated by reference.

This sensor has several disadvantages. The linear guide systems are connected in series, one after the other. Thus, the linear guide system which lies closest to the sensor reference base, in the case of a multiple-coordinate sensor which operates in three directions, must bear the weight of the following two guide systems, including their length-measuring systems and possibly zero-point and contact-force generators, and including the sensor-pin carrier and the sensor pins. The second guide system which follows the first guide system only bears the weight of the third guide system and its length-measurement system and possibly zero-point and contact-force generator, and the sensor-pin carrier and the sensor pins. The third guide system bears only the weight of the sensor-pin carrier and sensor pins. As a result of the different weights, greatly different static forces and moments must be borne or compensated by the corresponding linear guide system, and strongly varying dynamic forces and moments occur upon the accelerating and braking of the sensor.

Given these factors, the degree of rigidity and sagging of the individual guide systems differ very greatly, so that, in the final analysis, the respective degrees of uncertainty of the measurements made by the multiple-coordinate sensor in the three directions vary to at least some extent according to the direction. These difficulties arise, in particular, in a situation in which all the linear guide systems deflect simultaneously, for example, when scanning the surfaces of an object to be measured which lie obliquely to all of the guide axes, or in the case of measurements which are carried out very rapidly. They arise in particular when three-dimensional surfaces are contacted continuously, and at the same time, the measurement instrument and the measurement scanner are in continuous movement in all three axes ("scanning").

Due to the unfavorable weight distribution of this known multiple-coordinate sensor, the latter also cannot, in practice, be used in different positions in space. Forces and moments would occur which could only be compensated for with difficulty.

This known sensor also has the disadvantage that all the cables and lines associated with the second and third linear guide systems must, in each case, be conducted through the first and second linear guide systems because of the connection of the linear guide systems in series. Friction and hysteresis are thereby introduced into the system, further increasing the uncertainty of the measurement. The deforming of the lines upon deflection of the linear guide systems can, furthermore, lead to a cable break.

A multicoordinated scanner is disclosed in DE-OS 37 25 205-A1 (U.S. Pat. No. 4,882,848). The articulated elements in that reference, however, are arranged in series and not in parallel.

A serial device for positioning an article with respect to two coordinate axes is disclosed in U.S. Pat. No. 3,377,111.

U.S. Pat. No. 2,932,482 discloses a mounting system for articles which consists of a parallel array of serially structured positioning systems. The positioning systems allow not only three linear degrees of freedom but also two rotations. The parallel combination of serial positioning systems is accordingly necessary to suppress these rotations.

U.S. Pat. No. 4,805,543 discloses another device for positioning an object, consisting of a parallel array of two or three sliding guides. In this device the sliding guides disadvantageously must be non-rotatable, which is not a requirement in the present invention. The reference also discloses leaf-spring parallelograms which are different from and cannot suggest the invention disclosed and claimed herein. In the case of the invention, each leaf spring element corresponds to an element in another line of the three guide systems. Hence the number of spring elements can be reduced to half the number of leaf spring elements in the reference. The device also lacks any compensation for the weight of the kinematic system, and lacks length-measurement and zero-point determining devices. The latter are usable in the present invention for performing measurements, which is not done by the device in the reference.

SUMMARY OF THE INVENTION

The principal object of this invention therefore is to provide a multiple-coordinate measurement sensor which does not have these disadvantages and has, in particular, high accuracy of measurement, especially at higher measurement speeds.

This object is achieved by a multiple-coordinate measurement sensor as disclosed and claimed herein, and particularly by embodiments of the invention wherein two or three multiple-axis guide systems (7,13,19; 8,14,20; 9,15,21) are arranged in parallel, each of their length-measurement devices (6) and zero-point and contact-force generators (5) being fastened to the sensor reference base (1). Advantageously these devices (5,6) detect the position of the guides (7,8,9) lying closest to this base (1) and thus the position of the sensor pin (24) relative to the reference base (1). Further they may advantageously hold the guides (7,8,9) which are closest to this base (1) at a well-defined zero point and, upon deflection of these guides (7,8,9) from the zero-point, generate a well-defined contact-force between the sensor pins (24) and the object to be measured (25).

The guide systems (7,13,19; 8,14,20; 9,15,21) may comprise linear anti-friction bearing guides (28). The guide systems (7,13,19; 8,14,20; 9,15,21) may also comprise double rotary-joint plates (33) or leaf-spring elements (36), which may be equivalent. The guides (7,8,9) which lie closest to the sensor base (1) may comprise single rotary-joint plates (42) or leaf-spring elements (36'), which may be equivalent, and the guides (13,19; 14,20; 15,21) which follow said guides (7,8,9) in each multiple-axis guide system (7,13,19; 8,14,20; 9,15,21) may be developed in each case as a pair of double ball-joint supports (34) or flexure-spring elements (43), which may be equivalent. The guide systems (7,13,19; 8,14,20; 9,15,21) may also represent a combination of linear anti-friction bearing guides (28) and double rotary-joint plates (33).

In accordance with a basic concept of the invention, this is achieved by a combination of the following features:

a. The low-friction, low-wear as well as torsionally-rigid kinematic system which is moveable in two or three principal directions x, y and z comprises two or three multiple-axis guide systems which are arranged in parallel.

b. The length-measurement devices and possibly zero-point and contact-force generators are fastened in each case to the reference base.

c. The length-measurement devices detect, in the corresponding principal measurement directions, the positions of the respective guides which lie closest to the reference base, and thus the detected position of the sensor pin in each direction is directly referred to the reference sensor base.

d. The zero-point and contact-force generators also hold the guides that correspond to the pertinent principal directions (which lie closest to the sensor base and are directly referred to the sensor base) at a well-defined zero-point and, when these guides are deflected from the zero-point, create a well-defined contact-force between the feeler pins and the object to be measured.

As a further development of the basic inventive concept, linear anti-friction guides can be used as elements in the multiple-axis guide systems when large deflection lengths of the sensor are required which cannot be obtained with leaf-spring elements.

In the case of smaller deflections, the linear guide elements are preferably replaced by double rotary-joint plates or leaf-spring elements, which may be equivalent, the leaf-spring elements assuring the greatest possible freedom from play and wear.

A further development of the inventive concept leads to a simplified construction, in that the guides lying closest to the sensor base are replaced by single rotary-joint plates or leaf-spring elements, which may be equivalent, and the two guides which follow the just-mentioned guides in series in each multiple-axis guide system are formed in each case as a pair of double ball-joint supports, or flexible spring elements, which may be equivalent.

This coupling of the sensor-pin carrier according to the invention results in a reduction in the cost of the guides themselves. It also results in the elimination of statically overdetermined coupling, and thus allows simpler production and installation of the guide systems, since no highly-precise tolerances need be maintained.

As used herein, the term "statically overdetermined coupling" or "statically overdetermined support" refers to supporting a load at more points than necessary. For example, if a load is adequately supported by two supports, the insertion of a third support would overdetermine the position of the load. The length of the third support would be extremely critical, since if it was not precisely the same length as the first two supports, it either would not support the load or would support the load improperly. For example, if a long panel is supported on two supports, a third support which is too short will not support the panel, and if it is too long, the third support will bend the panel. The present invention avoids statically overdetermined coupling in the measurement sensor, as will be discussed in more detail below.

BRIEF DESCRIPTION OF THE DRAWINGS

Other objects, features and advantages of the invention will now be explained with reference to the drawings, in which:

FIG. 2 is a cross-section showing one of the linear guides of FIG. 1;

FIG. 4 is a perspective view of a double-joint plate including a leaf-spring element, which may be used in a modification of the embodiment of FIG. 3;

DETAILED DESCRIPTION

Figure 1:
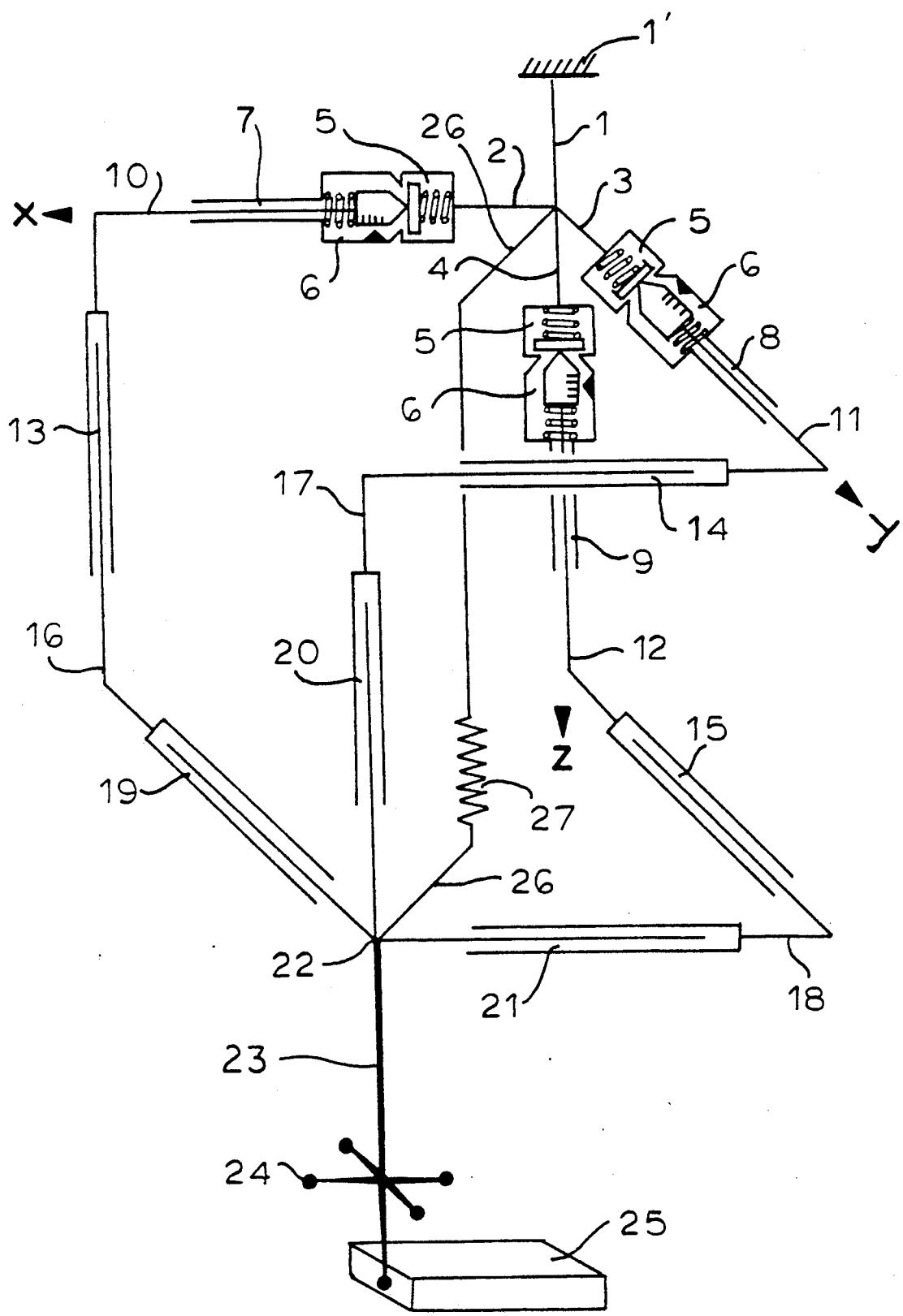
FIG. 1 is a schematic diagram of a sensor according to a first embodiment of the invention, having linear guides.

A first embodiment of the invention is shown schematically in FIG. 1. Mechanically stable connecting elements 2, 3, 4, which are parallel to the principal directions x, y and z, are seated on the sensor reference base 1 which is connected to the support 1' of the measurement machine or machine tool. Guides 7, 8 and 9 are firmly attached to these elements 2, 3, 4 so that the guides also point respectively in the three principal directions x, y and z.

A zero-point and contact-force generator 5 and a length-measurement system 6 connect each of these guides 7, 8, 9 to the corresponding one of the connecting elements 2, 3 and 4. As examples only, the length measurement device 6 may comprise a potentiometer, differential transformer, Hall-effect sensor, or the like. Each zero-point and contact-force generator 5 is a system which holds the moving or sliding parts of the guides 7, 8, 9 at a mechanically well-defined middle position from which the slides can be moved in both directions. Via spring elements the system 5 generates a contact force between the measurement-sensor pin 24, which is linked to the guides 7, 8, 9, and the object being measured. Examples of a length-measurement system and a zero-point and contact-force generator are shown in DE-AS 22 42 355, the disclosures of which are incorporated by reference herein.

Further guides 13 and 19 are connected to the guide 7 via two stable right-angle mechanical connecting elements 10 and 16, so that the three guides 7, 13, 19 together form a three-axis guide system which can be deflected in each of the three principal directions x, y and z. The position of this three-axis guide system is detected only in the x direction, by the length-measurement system 6, and the zero-point and contact force generators 5 also act only in the x direction, between the guide 7 and the connecting element 2.

Similarly, the guide 8 is connected to further guides 14, 20 by connecting elements 11, 17, and the guide 9 is connected to further guides 15, 21 by connecting elements 12, 18. Thus, two additional three-axis guide systems are formed, each of which can be deflected in the three principal directions x, y and z. Respective zero-point and contact-force generators 5 and length-measurement systems 6 are provided in these two three-axis guide systems, between the connecting element 3 and the guide 8, and the connecting element 4 and the guide 9, and act only in the principal directions y and z, respectively.

A sensor-pin carrier 23 is fastened to the three guides 19, 20, 21 via a connecting cross 22. The connecting cross 22 rigidly holds the guides 19, 20, 21 perpendicular to each other. The sensor-pin carrier 23 carries the sensor pins 24 which are used to contact the object 25 to be measured.

By this arrangement, the sensor-pin carrier 23 can be moved linearly in the three principal directions x, y and z, without any rotary degrees of freedom which would lead to impermissible tilting.

By the disclosed parallel arrangement of the above-mentioned three three-axis guide systems, one obtains very rigid sensor kinematics and the ability to directly detect the position of the sensor-pin carrier 23, with respect to the reference base 1, with only the three length-measurement systems 6 secured directly to the reference base 1.

Since all the zero-point and contact-force generators 5 are connected directly to the reference base 1, these parts do not impair the dynamic behavior of the sensor. Thus the important disadvantages of the prior art mentioned above are avoided. In this connection it is naturally also desirable to minimize the masses of the three three-axis guide systems which are connected in parallel.

FIG. 1 further shows an arrangement for weight equalization in the z direction. Respective fastening devices 26 are connected to the reference base 1 and the connecting cross 22, and between them a tension spring 27 is attached, this spring being so selected that it compensates for the weight of the parts of the sensor which are moveable in the z direction, which will usually be the direction of the force of gravity. The tension spring 27 also reduces lateral stresses on the parts of the sensor which are not moveable in the z direction.

FIG. 2 shows an example of a construction for the linear guides 7, 8, 9; 13, 14, 15; 19, 20, 21 in the form of anti-friction bearings 28. A round shaft 29 is guided linearly in the cylindrical housing 32 by balls 30, which are held spaced from each other by a cage 31. Means to prevent rotary movement of the shaft 29 within the housing 32 are not necessary, since the three groups of guides 7, 14, 21 and 8, 15, 19 and 9, 13, 20 in FIG. 1 together provide a parallel guide system which does not permit turning or tilting.

For example, the guides 7, 14, 21 in FIG. 1 together prevent any rotary movement of the cross 22 about an axis parallel to the X-axis, regardless of whether the guides 7, 14, 21 individually can rotate about an axis parallel to the X-axis. In the same way the combinations of the guides 8, 15, 19 and 9, 13, 20 prevent any rotary movement of the cross 22 about axes parallel to the Y-axis and Z-axis, respectively. Thus it is not necessary in the guide construction of FIG. 2 to prevent rotary movement of the shaft 29 within the housing 32.

Figure 3:
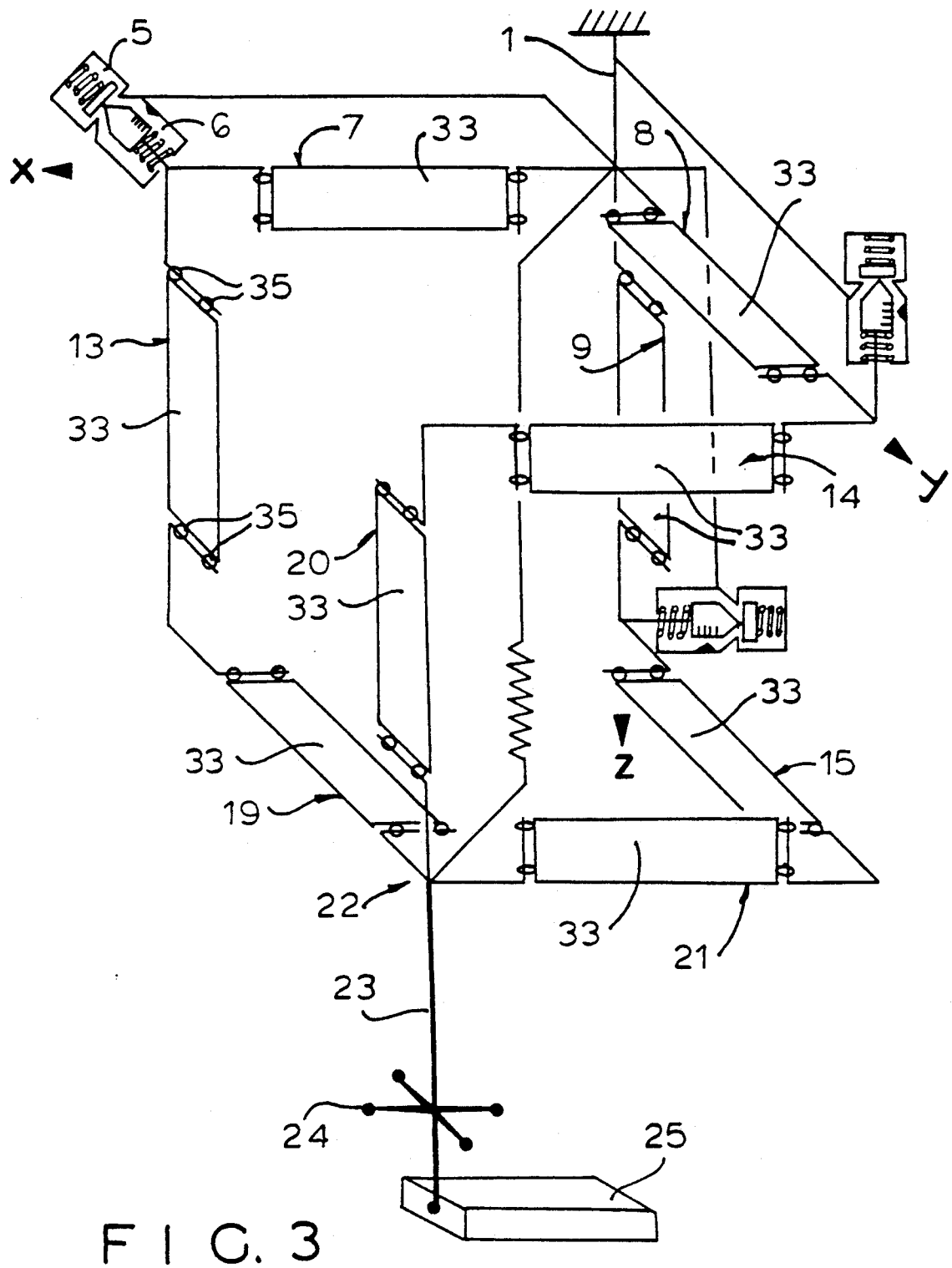
FIG. 3 shows a variation of the embodiment of FIG. 1, wherein the guides comprise double rotary-joint plates.

In FIG. 3, the linear guides 7, 13, 19; 8, 14, 20; 9, 15, 21 of FIG. 1 are replaced by double rotary-joint plates 33. Each plate 33 comprises, in this example, a plate with a rotary-joint bearing 35 at each of its four corners.

In FIG. 4 is shown, as another example, the construction of a leaf-spring element 36 which can take the place of the double rotary-joint plates 33 of FIG. 3. A leaf spring 37, with stiffeners 38, is connected at both ends via clamping pieces 39 to the mechanical elements 40. The mechanical elements 40 hold the leaf spring elements 36 to each other, for example at right angles, and also hold the leaf spring elements 36 to the connecting cross 22. Thus, in this multiple-axis guide system, the leaf spring elements 36, by the bending of the leaf springs 37 in their unstiffened regions, can carry out play-free, friction-free movement with respect to each other. Tilting of the elements and thus of the guide system is prevented, in this case also, by the fact that the three groups of leaf-spring elements corresponding to the guides 7, 14, 21 and 8, 15, 19 and 9, 13, 20 in FIG. 3 together form a three-element leaf-spring parallelogram.

Figure 5:
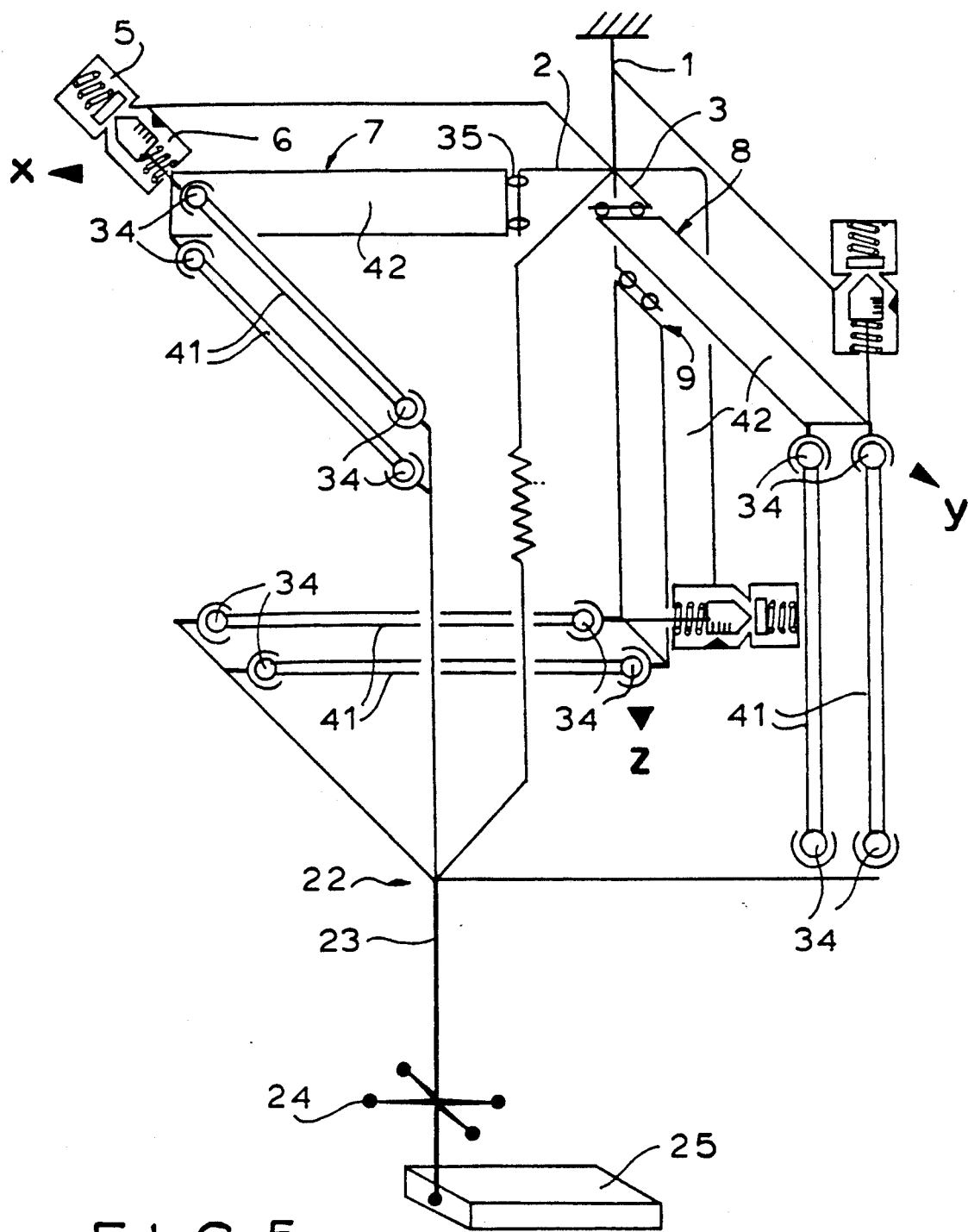
FIG. 5 shows a variation of the embodiments of FIGS. 1 and 3, wherein the guides variously comprise single rotary-joint plates and double ball-joint supports.

In the embodiment of FIG. 5, the guides 13, 19 and 14, 20 and 15, 21 are replaced by double ball-joint supports 41, and the guides 7, 8, 9 are single rotary-joint plates 42. The latter differ from the double rotary-joint plates 33 of FIG. 3 in that two joint bearings 35 are provided at only one end, the double-ball-joint supports 41 being fastened to the other end. Each double ball joint support is tiltable in two directions when the connecting cross and the sensor pin are moved, but the double ball joint supports are not rotatable or twistable about their own axes, thus maintaining the torsional rigidity of the system.

For example, if the sensor pin is moved in the X-direction, the ball joints parallel to the X-axis do not tilt, but rather they translate lengthwise in the X-direction. The element 9 rotates about the Y-axis; the ball joints parallel to the Y-axis tilt around the Z-axis; and the ball joints parallel to the Z-axis tilt about the Y-axis.

An advantage of this embodiment is a reduction in the cost of the guides and the elimination of the statically overdetermined coupling between sensor-pin carrier 23 and reference base 1. This is possible since ball joints 34 are arranged at both ends of all the supports 41.

More specifically, in the embodiment of FIG. 3 the three elements 7, 14, 21, which all extend in the X direction, must all have the same length Otherwise stress would be created in the structure. This requires the elements to be manufactured to a close tolerance, and this increases the cost of the sensor and the difficulty of making it and keeping it in service.

In FIG. 5 the cross 22 is supported at six points by six double-ball-joint supports 41. Accordingly, all six degrees of freedom of the cross are provided by these six support points. One of these six double-ball-joint supports could be slightly shorter than the others, without causing any stress Therefore, in this embodiment the length tolerance of the supports is not critical, which leads to economies.

Figure 6:
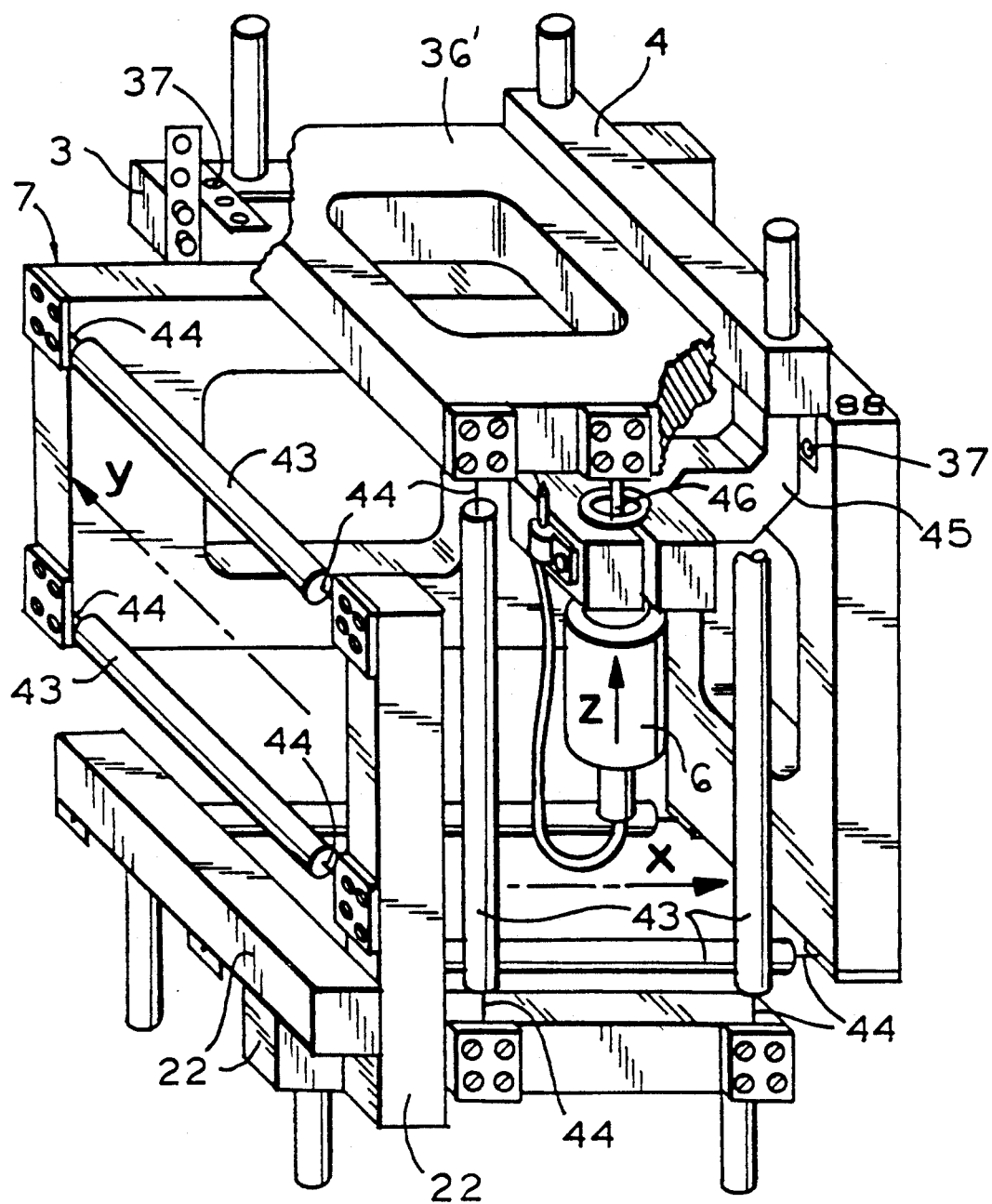
FIG. 6 is a perspective view of a measurement sensor similar to that shown in FIG. 5.

FIG. 6 is a perspective view of the sensor which was shown schematically in FIG. 5, but with different guides. In FIG. 6, the single rotary-joint plates 42 are replaced by single leaf-spring elements 36' and the double-ball-joint supports 41 are replaced by flexural-spring element pairs 43. In a single leaf-spring element 36', leaf springs are arranged only at one side and in the flexural spring element pairs 43, flexural springs 44 take the place of the joints 34.

On the stable connecting elements 3, 4 (2 is not visible) which are connected to the sensor reference base (not shown), the single leaf-spring elements 36' are fastened, first of all, via leaf springs 37 in such a manner that they correspond to the guides 7, 8, 9 and permit swinging movements in x, y and z direction. Adjoining each of the elements 36' is a respective flexural-spring element pair 43. The latter then bear the connecting cross 22 to which the sensor-pin carrier (not shown) and the sensor pins are fastened.

The element 36' shown at the top of FIG. 6 corresponds generally to the element 42 at the upper right in FIG. 5. It pivots about the X-axis, as does the element 42 in FIG. 5 which extends parallel to the Y-axis.

The element 36' in FIG. 6 functions like the single-rotary-joint plate 42 in FIG. 5 because at the rear end it is fixed by horizontal cross spring joints or leaf springs 37 to the horizontal connecting element 3. Thus it pivots about the X-axis via these leaf springs 37 without any friction or backlash, even though the main body of the element 36' is rigid.

The flexural spring element pairs 43 in FIG. 6 correspond to the ball joint support pairs 41 in FIG. 5. The function of the ball joints is performed by short wire lengths 44 which allow the tilting of the overall rigid support elements 43. The wire elements 44 are stiff in the axial direction, in view of their shortness, but they can be flexed like the ball joints 34 and will bend upon movement of the sensor pin. Thus the operation of the FIG. 6 device corresponds generally to that of FIG. 5 explained above.

The provision of a length-measurement system 6 is shown by way of example. It is fastened via the mount 45 on the element 4 and is connected via the measurement pin 46 to the single leaf-spring element 36' and thus measures the movement of the entire system in the z direction.

Although the invention has been described herein with respect to specific embodiments thereof, the appended claims are not to be construed as limited to those embodiments, but rather to include any modifications and variations of the invention which may occur to one of ordinary skill in the art which fairly fall within its scope.

What is claimed is:

1. A multiple-coordinate measurement sensor comprising:
   a) a reference base which defines three mutually perpendicular directions X, Y and Z;
   b) feeler means for being scanned over a surface of an object which is to be measured;
   c) first, second and third parallel support systems, said support systems comprising respectively:
      1) first, second, and third measuring arms which are firmly secured at first ends thereof to said reference base and each extending from said reference base in a respective one of said X, Y and Z directions;
      2) first, second and third intermediate arms having first ends which are attached perpendicularly to second ends of said first, second and third measuring arms; and
      3) first, second and third feeler support arms having first ends which are attached perpendicularly to second ends of said first, second and third intermediate arms;
      4) said first, second and third feeler support arms having second ends which are connected to each other mutually perpendicularly; each of said feeler support arms extending in a respective one of said first, second and third directions, and at the connection thereof being firmly secured to said feeler means, which extends from said connection in said Z direction;
   d) means on said first, second and third support systems permitting said feeler means to be moved freely in said X, Y and Z directions and combinations thereof; and
   e) first, second and third measuring means engaging said reference base and engaging said first, second and third measuring arms, for detecting the position of said feeler means with respect to said reference base, by detecting movement of said corresponding first, second and third measuring arms, each of said measuring means detecting said movement only in a respective one of said X, Y and Z directions.

2. A multiple-coordinate measurement sensor as in claim 1, further comprising a respective zero-point and contact-force generating means associated with each measuring arm, for defining a zero-point for each said measuring arm, and upon movement of said measuring arm from said zero-point, generating a defined contact force between the feeler means and the object being measured.

3. A multiple-coordinate measurement sensor as in claim 2, wherein each said zero-point and contact-force generating means is attached to said reference base and to its respective measuring arm.

4. A multiple-coordinate measurement sensor as in claim 1, wherein each said measuring means has one portion attached to said reference base and another portion attached to the respective measuring arm.

5. A multiple-coordinate measurement sensor as in claim 1, further comprising means for compensating for the mass of said support systems and feeler means.

6. A multiple-coordinate measurement sensor as in claim 5, wherein said compensating means exerts a force which tends to draw the feeler means and reference base toward each other.

7. A multiple-coordinate measurement sensor as in claim 6, wherein said compensating means comprises a tension spring.

8. A multiple-coordinate measurement sensor as in claim 1, wherein said first, second and third measuring arms each comprise housing means fixed to said reference base; a longitudinal axis defined therein; anti-friction bearing means on said housing means; and shaft means supported on said bearing means for being extendible longitudinally with respect to the housing means.

9. A multiple-coordinate measurement sensor as in claim 8, wherein said housing means comprises an elongated housing with a hollow longitudinal axis; said bearing means comprises bearings along said hollow longitudinal axis; and said shaft means comprises a shaft supported on said bearing means for being movable along said hollow longitudinal axis.

10. A multiple-coordinate measurement sensor as in claim 9, wherein said shaft, is rotatable on said bearings about said hollow longitudinal axis.

11. A multiple-coordinate measurement sensor as in claim 8, wherein said measuring means is fixed with respect to said housing means and detects movement of said shaft means with respect to said housing means.

12. A multiple-coordinate measurement sensor as in claim 11, wherein said housing means and said shaft means of said first, second and third measuring arms extend in respective ones of said X, Y and Z directions, and said measuring means correspondingly detects movement of said shaft means in said respective X, Y and Z directions.

13. A multiple-coordinate measurement sensor as in claim 8, wherein said intermediate arms and said feeler support arms each comprise housing means; a longitudinal axis defined therein; anti-friction bearing means on said housing means; and shaft means supported on said bearing means for being extendible longitudinally with respect to the housing means.

14. A multiple-coordinate measurement sensor as in claim 1, wherein each of said arms comprises a respective double-rotary-joint plate means.

15. A multiple-coordinate measurement sensor as in claim 1, wherein each of said arms comprises a respective leaf-spring element means.

16. A multiple-coordinate measurement sensor, as in claim 1, wherein each of said measuring arms comprises a respective single-rotary-joint plate means and each of said intermediate and feeler support arms comprises a pair of double-ball-joint support means.

17. A multiple-coordinate measurement sensor as in claim 1, wherein each of said measuring arms comprises a respective leaf-spring element means and each of said intermediate and feeler support arms comprises a pair of flexure-spring element means.

18. A multiple-coordinate measurement sensor as in claim 1, wherein each of said arms comprises means selected from the group consisting of linearly extendible anti-friction bearing means and double-rotary-joint plate means.

* * * * *